(12) United States Patent
Langhammer

(10) Patent No.: US 7,003,544 B1
(45) Date of Patent: Feb. 21, 2006

(54) METHOD AND APPARATUS FOR GENERATING A SQUARED VALUE FOR A SIGNED BINARY NUMBER

(75) Inventor: Martin Langhammer, Poole (GB)

(73) Assignee: Altera Corporation, San Jose, CA (US)

( * ) Notice: Subject to any disclaimer, the term of this patent is extended or adjusted under 35 U.S.C. 154(b) by 622 days.

(21) Appl. No.: 10/145,322

(22) Filed: May 14, 2002

Related U.S. Application Data

(60) Provisional application No. 60/329,881, filed on Oct. 16, 2001.

(51) Int. Cl.
*G06F 7/552* (2006.01)

(52) U.S. Cl. .................................................... 708/606

(58) Field of Classification Search ................ 708/606, 708/625
See application file for complete search history.

(56) References Cited

U.S. PATENT DOCUMENTS

| | | | | | |
|---|---|---|---|---|---|
| 4,313,174 | A | * | 1/1982 | White | 708/606 |
| 5,629,885 | A | * | 5/1997 | Pirson et al. | 708/606 |
| 5,957,999 | A | * | 9/1999 | Davis | 708/606 |
| 6,567,832 | B1 | * | 5/2003 | Ono et al. | 708/606 |
| 6,775,685 | B1 | * | 8/2004 | Wood | 708/606 |

\* cited by examiner

*Primary Examiner*—D. H. Malzahn
(74) *Attorney, Agent, or Firm*—L. Cho

(57) ABSTRACT

A squaring circuit for signed binary numbers includes a signed binary number modification unit that generates a modified signed binary number. The squaring circuit includes a partial product generation unit that generates partial products that make up a squared value of the modified signed binary number. The squaring circuit includes a correction value generation unit that generates a correction value for the signed binary number. The squaring circuit includes a summing unit that sums the partial products with the correction value to generate a squared value for the signed binary number.

30 Claims, 15 Drawing Sheets

|     | a  | b  | c  | d  |
|-----|----|----|----|----|
|     | a  | b  | c  | d  |
| a   |    |    |    | dd | ← 201 G
| a   |    |    | cd | cd | ← 202 F
|     | ad | bd | cc | bd | ← 203 E
|     | ad | bc | bc | ad | ← 204 D
|     | ac | bb | ac |    | ← 205 C
|     | ab | ab |    |    | ← 206 B
|     | aa |    |    |    | ← 207 A

|    | A' | B' | C' | D' | E' | F' | G' |
|----|----|----|----|----|----|----|----|
|    |    |    | 0  | 0  | 0  | 0  | 1  |
|    |    |    | 1  | 1  | 0  | 0  | 1  |
|    |    | 0  | 0  | 0  | 0  | 0  | 0  |
|    |    | 1  | 1  | 0  | 0  | 0  | 1  |
|    |    |    | 0  | 1  | 1  | 0  | 0  |

FIG. 8a

|   |   | 1 | 0 | 0 | 1 | 0 |
|---|---|---|---|---|---|---|
|   |   | 0 | 0 | 0 | 1 | 0 |
|   |   | 0 | 0 | 0 | 0 | 1 |
|   |   | 1 | 0 | 0 | 1 | 0 |
|   |   |   | 0 | 1 |   |   |
|   |   |   |   |   |   | 0 |

FIG. 8b

PARTIAL PRODUCTS / CORRECTION VALUE / SQUARED SBN

METHOD AND APPARATUS FOR GENERATING A SQUARED VALUE FOR A SIGNED BINARY NUMBER

RELATED APPLICATIONS

This application claims the benefit of the priority date of U.S. Provisional Application 60/329,881 filed on Oct. 16, 2001 under 35 U.S.C. §119(e).

FIELD OF THE INVENTION

The present invention relates generally to the field of squaring signed binary numbers. More specifically, the present invention relates to an improved technique for squaring signed binary numbers in integrated circuits.

BACKGROUND

Modulators and demodulators of signals often employ unsigned squaring circuits that square the signals in order to shift and re-shift the frequency of the signals. Unsigned squaring circuits are specialized multiplication circuits that are smaller in size and more efficient in performance than general multiplication circuits. In communication applications, however, most signals are signed. In order to use the more efficient unsigned squaring circuit for these applications, the absolute value of the signal is taken by the modulators and demodulators before transmitting the signal to the unsigned squaring circuit.

When modulators and demodulators are implemented using programmable logic, however, implementing circuitry that takes an absolute value of a signed signal would require additional adder and multiplexing components. The additional adder and multiplexing components would add levels of logic that would not only increase the size of the modulator and demodulator, but also decrease the performance and increase the routing resources required of the modulators and demodulators.

Thus, what is needed is an efficient squaring circuit architecture that may square signed numbers without incurring the drawbacks of prior art approaches.

SUMMARY

A method for squaring a signed binary number is disclosed. Instead of squaring an absolute value of the signed binary number when the signed binary number is negative, which would typically require taking a 2's complement of the signed binary number, a 1's complement representation of the signed binary number is squared when the signed binary number is negative. The squared value of the 1's complement representation is summed with correction values to generate a squared value of the signed binary number. By squaring a 1's complement representation of the signed binary number and adding correction values instead of squaring a 2's complement representation of the signed binary number, levels of logic elements on a programmable logic may be conserved.

A method for generating a squared value of a signed binary number is disclosed according to an embodiment of the present invention. A modified signed binary number is generated by either inverting bits of the signed binary number if the signed binary number is negative or designating the signed binary number as the modified signed binary number if the signed binary number is positive. The modified signed binary number is squared to generate a squared modified signed binary number. The squared modified signed binary number is summed with a correction value.

A method for generating a squared value of a signed binary number is disclosed according a second embodiment of the present invention. An XOR function is performed on bit values of the signed binary number with a value of a most significant bit of the signed binary number to generate a modified signed binary number. The modified signed binary number is squared to generate a squared modified signed binary number. The squared modified signed binary number is summed with a correction value.

A method for generating a squared value for a signed binary number is disclosed according to a third embodiment of the present invention. A third most significant bit (MSB) of the squared value is assigned a first bit value that includes a sum of a modified bit value of a second MSB of the signed binary number with a product of the modified bit value of the second MSB of the signed binary number with a modified bit value of a third MSB of the signed binary number. A fourth MSB of the squared value is assigned a second bit value that includes a product of the modified bit value of the second MSB of the signed binary number with a modified bit value of a fourth MSB of the signed binary number. A least significant bit (LSB) of the squared value is assigned a third bit value that includes a sum of a modified bit value of a LSB of the signed binary number and a bit value of the MSB of the signed binary number.

A squaring circuit for signed binary numbers is disclosed. The squaring circuit includes a signed binary number modification unit that generates a modified signed binary number. The squaring circuit includes a partial product generation unit that generates partial products that make up a squared value of the modified signed binary number. The squaring circuit includes a correction value generation unit that generates a correction value for the signed binary number. The squaring circuit includes a summing unit that sums the partial products with the correction value to generate a squared value for the signed binary number.

BRIEF DESCRIPTION OF THE DRAWINGS

The features and advantages of the present invention are illustrated by way of example and are not intended to limit the scope of the present invention to the particular embodiments shown, and in which:

FIG. 2a illustrates partial products generated from an un-optimized unsigned squaring operation on a four bit signed binary number;

FIG. 3a illustrates partial products generated from an un-optimized unsigned squaring operation on an eleven bit signed binary number;

FIG. 3b illustrates partial products generated from an optimized unsigned squaring operation on an eleven bit signed binary number;

FIG. 4c illustrates a summing of partial products and a correction value for a four bit signed binary number;

FIG. 5a illustrates partial products generated from an optimized signed squaring operation on an eleven bit modified signed binary number;

FIG. 5b illustrates partial products generated from a further optimized signed squaring operation on an eleven bit modified signed binary number;

FIG. 5c illustrates a summing of partial products and a correction value for an eleven bit signed binary number;

FIG. 8a illustrates exemplary partial products generated from a further optimized signed squaring operation on a four bit modified signed binary number; and FIG. 8b illustrates a summing of partial products and a correction value for a four bit signed binary number.

DETAILED DESCRIPTION

Figure 1:
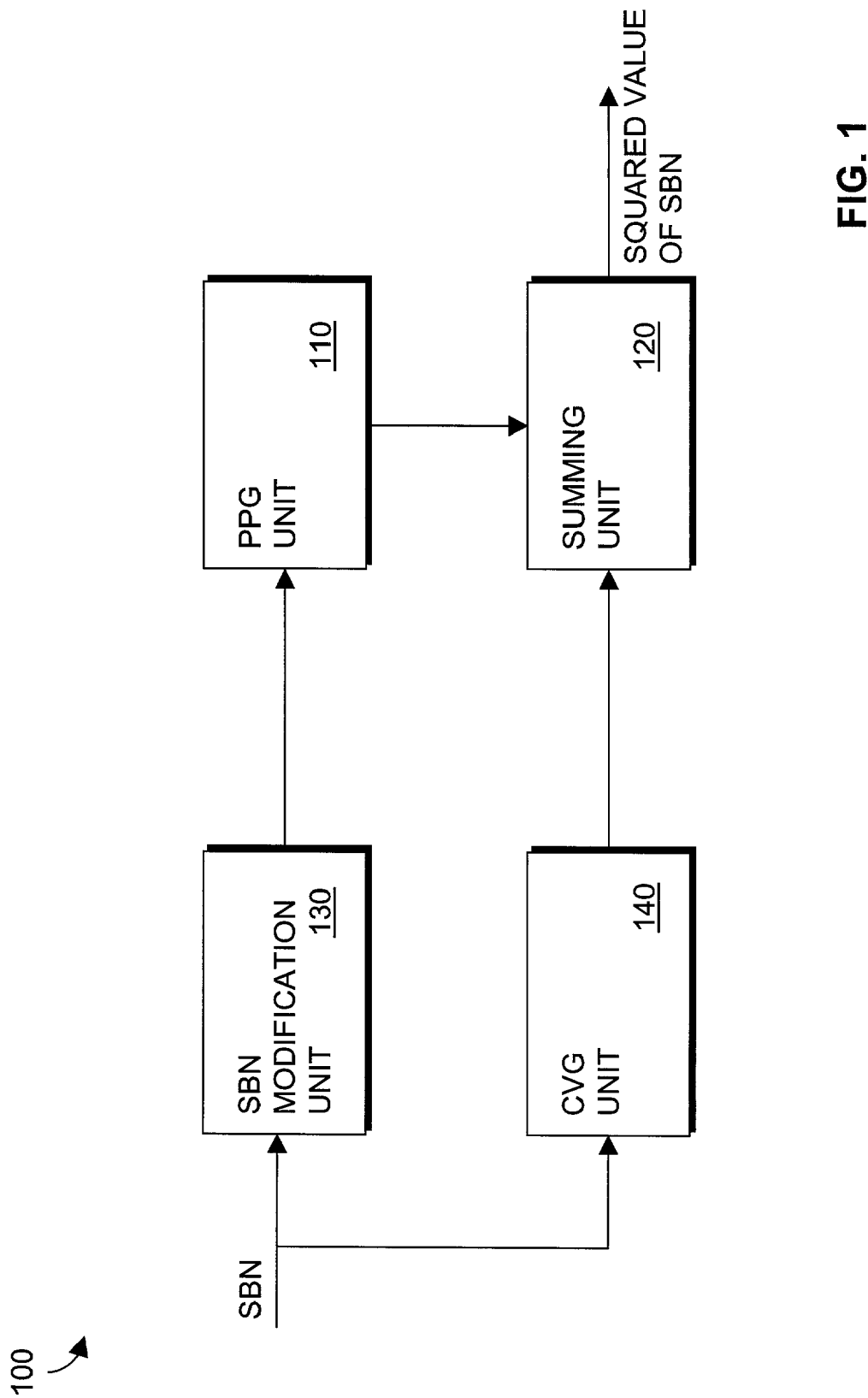
FIG. 1 is a block diagram that illustrates a squaring circuit according to an embodiment of the present invention.

FIG. 1 is a block diagram that illustrates a squaring circuit 100 according to an embodiment of the present invention. The squaring circuit 100 includes a partial products generation unit 110. The partial products generation unit 110 operates to generate partial products used to calculate bit values of a squared binary number.

FIG. 2a illustrates partial products generated from an un-optimized, unsigned squaring operation on the four bit unsigned binary number a b c d, where a, b, c, and d represent binary bit values from a most significant bit (MSB) to a least significant bit (LSB). Binary number A B C D E F G represents the squared value of signed binary number a b c d, where A, B, C, D, E, F, and G represent binary bit values in order from MSB to LSB. Columns 201–207 include partial products that are used to calculate the bit values of bits A, B, C, D, E, F, and G respectively. In this example, the partial product dd, shown in column 201, is equal to the bit value of bit G. The sum of partial products cd and cd, shown in column 202, is equal to the bit value of bit F with carry over affecting the next significant bit. The sum of partial products bd, cc, and bd, shown in column 203, and any carry over from column 202 is equal to the bit value of bit E with carry over affecting the next significant bit. The sum of partial products ad, bc, bc, and ad, shown in column 204, and any carry over from column 203 is equal to the bit value of bit D with carry over affecting the next significant bit. The sum of partial products ac, bb, and ac, shown in column 205, and any carry over from column 204 is equal to the bit value of bit C with carry over affecting the next significant bit. The sum of partial products ab and ab, shown in column 206, and carry over from column 205 is equal to the bit value of bit B with carry over affecting the next significant bit. The partial product aa, shown in column 207, summed with any carry over from column 206 is equal to the bit value of bit A with carry over affecting the next significant bit.

Figure 2B:
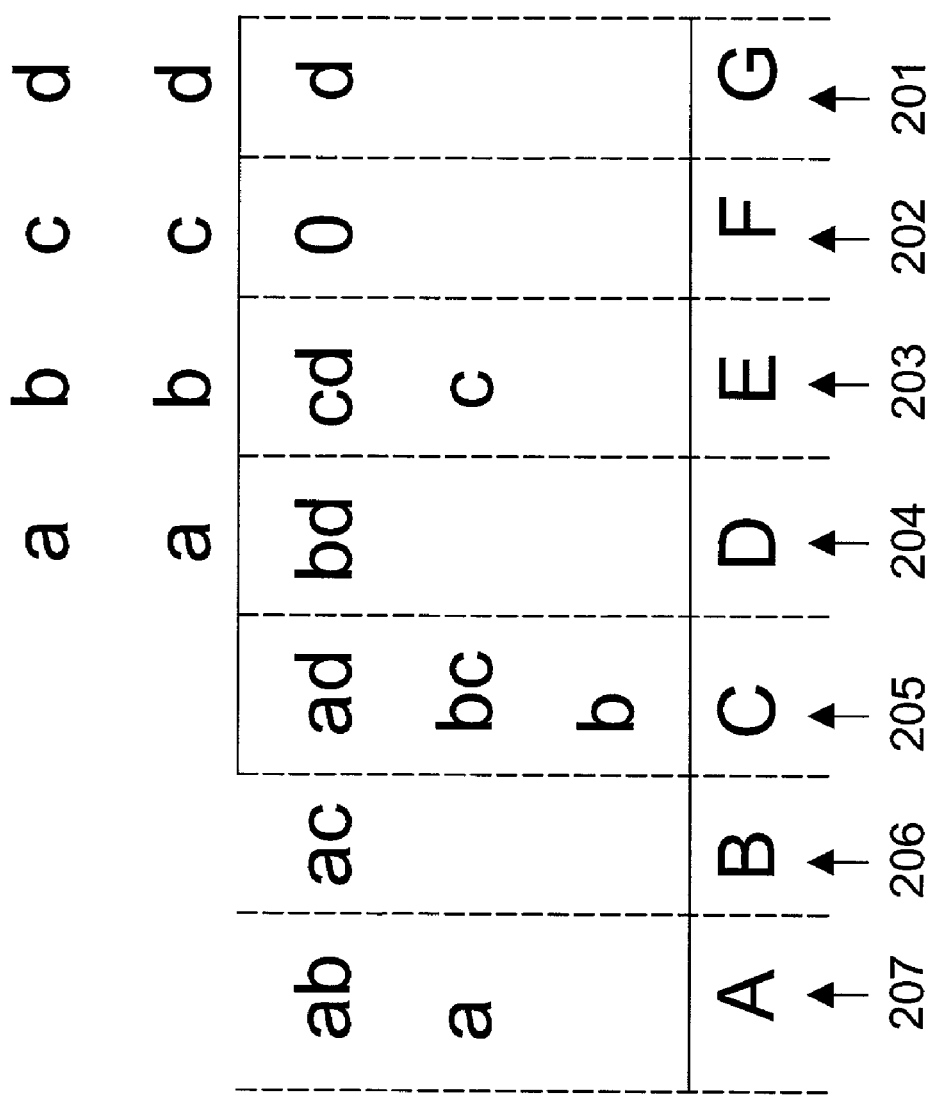
FIG. 2b illustrates partial products generated from an optimized unsigned squaring operation on a four bit signed binary number.

When both a multiplicand and multiplier are the same, techniques may be applied to optimize the unsigned squaring operation. A first technique may be applied to simplify partial products that include terms multiplied by itself. First, any bit multiplied by itself is just that bit. For example, zero multiplied by zero equals 0, and one multiplied by one equals one. Thus, partial products having terms multiplied by itself may be replaced by a single instance of the term. In the example shown in FIG. 2a, dd may be replaced by d in column 201, and aa may be replaced by a in column 207. A second technique may be applied to reduce the number of identical partial products in a column. Since base 2 convention is being used, when identical terms are present in a column, the identical terms may be replaced in the next column by a single instance of the term. For example, column 202 has terms cd an cd, which equals 2cd. This is identical to having cd in column 203. Similarly, column 203 has terms bd and bd which equals 2bd. This is identical to having bd in column 204. FIG. 2b illustrates partial products generated from an optimized unsigned squaring operation on a four bit unsigned binary number a b c d using the optimization techniques disclosed.

Figure 3A:
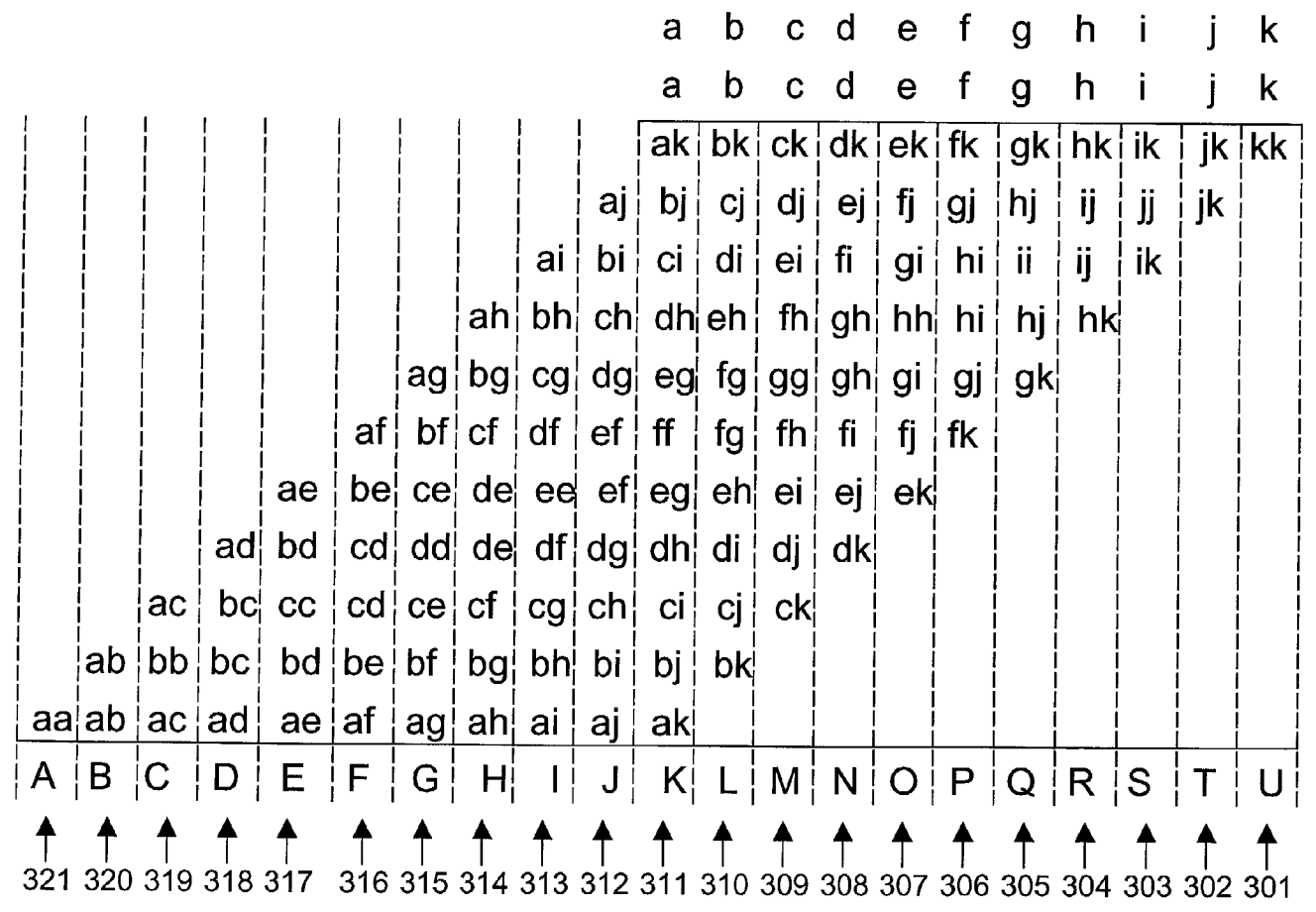
Figure 3B:
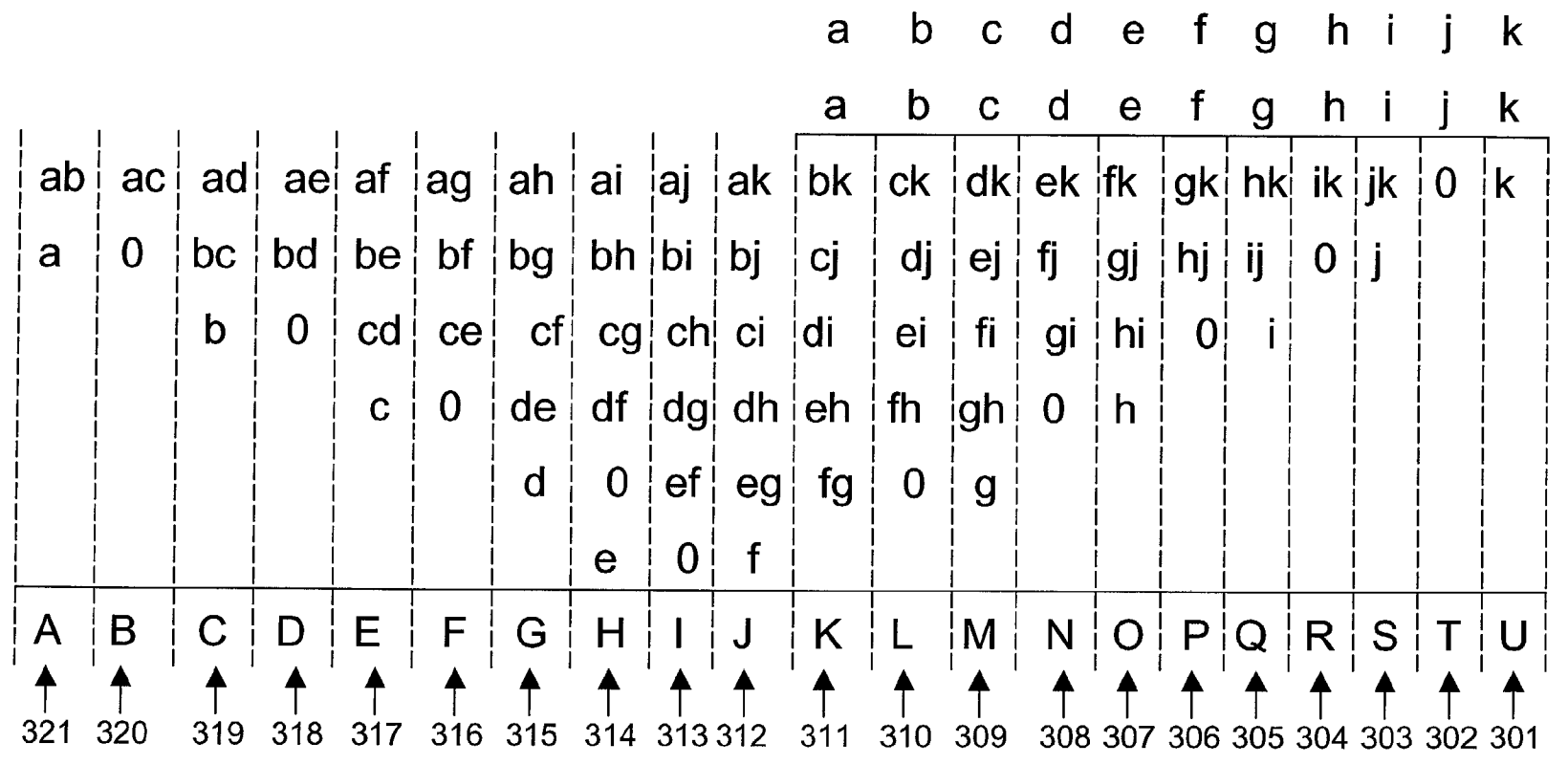

FIG. 3a illustrates exemplary partial products generated from an un-optimized unsigned squaring operation on an eleven bit unsigned binary number a b c d e f g h i j k, where a, b, c, d, e, f, g, h, i, j, and k represent binary bit values from MSB to LSB. Binary number A B C D E F G H I J K L M N O P Q R S U represents the square value of signed binary number a b c d e f g h I j k, where A, B, C, D, E, F, G, H, I, J, K, L, M, N, O, P, Q, R, S, and U represent binary bit values from MSB to LSB. Columns 301–321 include partial products that are used to calculate the bit values of bits A, B, C, D, E, F, G, H, I, J, K, L, M, N, O, P, Q, R, S, T, and U respectively. Utilizing the optimization techniques disclosed, the number of partial products for the eleven bit unsigned binary number simplify as shown in FIG. 3b. FIG. 3b illustrates partial products generated from an optimized unsigned squaring operation on the eleven bit unsigned binary number a b c d e f g h i j k.

According to an embodiment of the squaring circuit 100 (shown in FIG. 1), the partial products generation unit 110 (shown in FIG. 1) utilizes the optimization techniques disclosed above to generate partial products.

Referring back to FIG. 1, the squared signing circuit 100 includes a summing unit 120. The summing unit 120 sums the partial products generated by the partial product generation unit 110 to determine a squared value of a signed binary number. According to an embodiment of the present invention, the partial product generation unit 110 and the summing unit 120 may be implemented using known circuitry and techniques used in unsigned squaring circuits.

When a signed binary number is represented using a 2's complement fixed-point format, the absolute value of a negative number may be derived by taking the 2's complement of the signed binary number. Instead of taking an absolute value of a signed binary number and squaring the absolute value using the partial products generation unit 110 and the summing unit 120, the squaring circuit 100 utilizes an improved squaring technique. The squaring circuit 100 squares a modified signed binary number derived from the signed binary number and utilizes the result to generate a squared value of the signed binary number.

If the signed binary number is represented as x, the 1's complement of the signed binary number may be represented as the inverse of x (!x). The inverse of x is the bitwise inversion of x. The 2's complement of the signed binary number may be represented as the inverse of x plus 1 (!x+1). Thus, the square of a negative signed binary number represented as x may be represented as the square of (!x+1) or !x!x+2!x+1. According to an embodiment of the present invention, instead of squaring the absolute value or the 2's complement of the signed binary number when the signed binary number is negative, the squaring circuit 100 squares a modified signed binary number which is a 1's complement representation of the signed binary number. The square of the 1's complement representation is summed with correction values, 2!x+1, to generate a squared value of the signed binary number.

The squaring circuit 100 includes a signed binary number modification unit 130. The signed binary modification unit 130 generates a modified signed binary number from the signed binary number that may be processed by the partial products generation unit 110. According to an embodiment of the squaring circuit 100, when a signed binary number is negative, the signed binary number modification unit 130 inverses the bit values of the signed binary number (takes the 1's complement of the signed binary number). When the signed binary number is positive, the signed binary number modification unit 130 designates the signed binary number as the modified signed binary number. According to an embodiment of the present invention, when the signed binary number is represented using a two's complement fixed-point format, the signed binary number modification unit 130 performs an XOR function on the signed binary number with a sign bit (a most significant bit) of the signed binary number.

The squaring circuit 100 includes a correction value generation unit 140. The correction value generation unit 140 generates a correction value that is to be added with the square of the modified signed binary number to generate a square value of the signed binary number. According to an embodiment of the present invention, the correction value has the value of two times the inverse bit values of the signed binary number plus one (2!x+1). According to an embodiment of the correction value generation unit 140, the correction value generation unit 140 performs an XOR function on the bit values of the signed binary number with a sign bit (a most significant bit) of the signed binary number to generate a result, performs an AND function on the result with the sign bit, shifts the bit values of the results up one order, and adds the bit value of the sign bit of the signed binary number.

Referring back to FIG. 1, the partial products generation unit 110 receives the modified signed binary number from the signed binary number modification unit 130. The partial products generation unit 110 generates partial products that are used to calculate the squared value of the modified signed binary number. The summing unit 120 receives the correction value generated by the correction value generation unit 140. The summing unit 120 sums the correction value with the partial products generated by the partial products generation unit 110 to generate the squared value of the signed binary number.

Figure 4A:
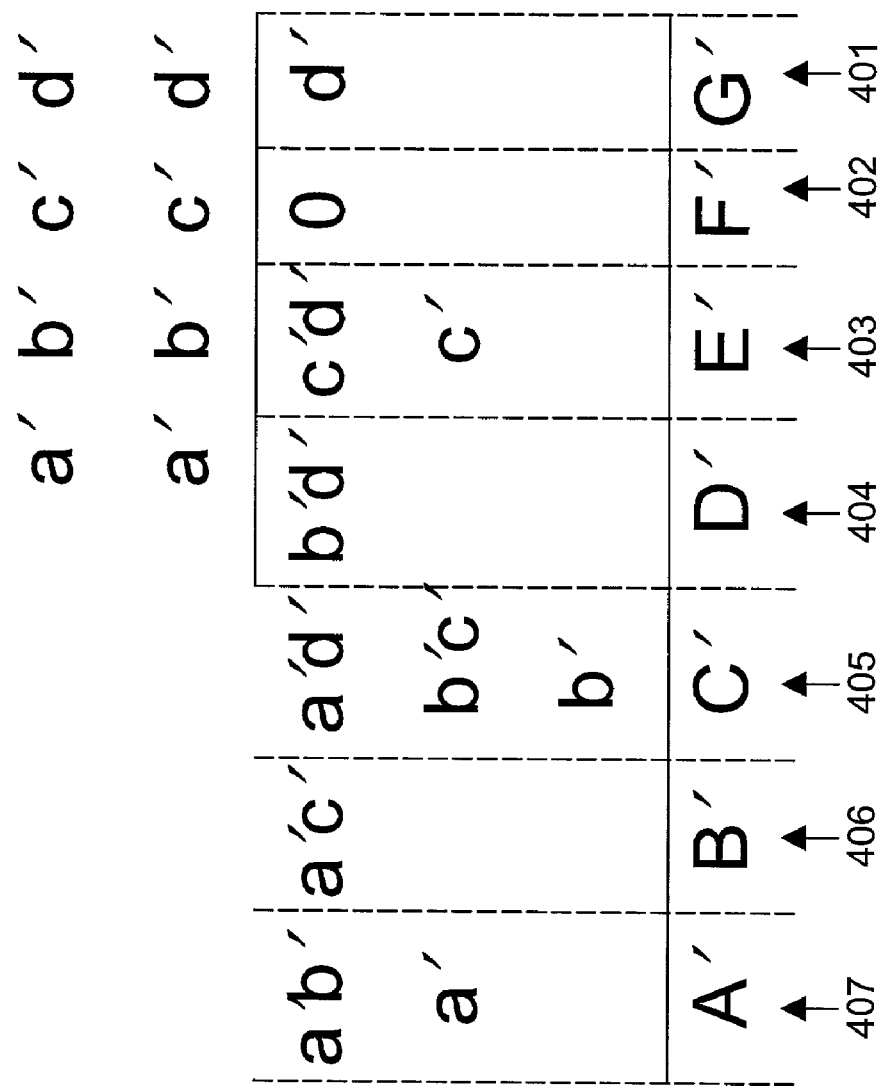
FIG. 4a illustrates partial products generated from an optimized signed squaring operation on a four bit modified signed binary number.

FIG. 4a illustrates partial products generated from an optimized signed squaring operation on a four bit modified signed binary number a' b' c' d', where a', b', c', and d' represent binary bit values in order from MSB to LSB. Binary number A' B' C' D' E' F' G' represents the square value of the modified signed binary number a' b' c' d', in order from MSB to LSB. The number a' b' c' d' represents a modified signed binary number derived from the signed binary number a b c d. To generate the modified signed binary number, each bit of the signed binary number is XORed with the signed bit (the most significant bit). The conversion equation may be expressed as: Bit=Bit XOR Sign Bit.

Figure 4B:
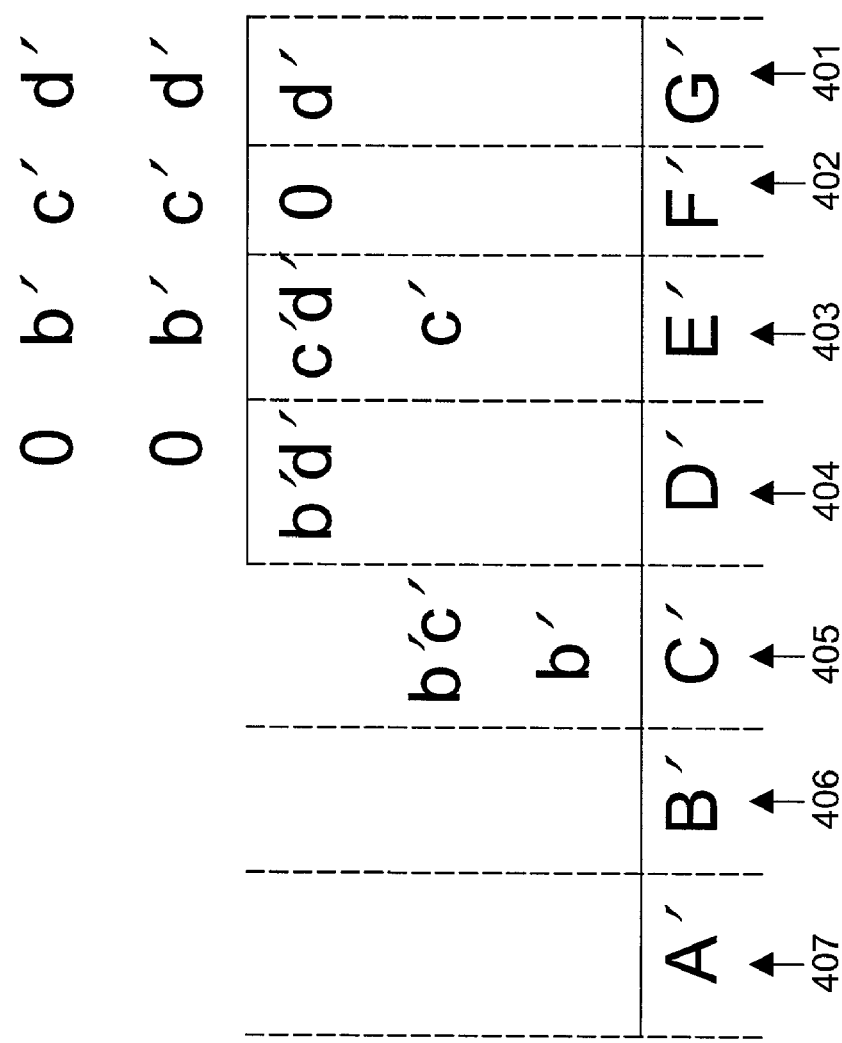
FIG. 4b illustrates partial products generated from a further optimized signed squaring operation on a four bit modified signed binary number.

Columns 401–407 include partial products that are used to calculate the bit values of bits A', B', C', D', E', F', and G' respectively. Utilizing the optimization techniques disclosed with reference to FIGS. 2 and 3, the number of partial products for the four bit signed binary number simplify as shown. When using the squaring technique described, additional techniques can be used to further optimize the squaring operation. First, if the sign bit (most significant bit of the signed binary number), a, is zero, the signed binary number is number is positive. When the signed binary number is positive, the signed binary number is assigned as the modified signed binary number and thus a' remains zero. This is consistent with the result of the conversion equation above since the bit value a XORed with the bit value a is zero when a equals zero. Second, if the sign bit (the most significant bit of the signed binary number), a, is one, the signed binary number is negative. When the signed binary number is negative, the bit values of the signed binary number are inverted to generate a modified signed binary number and thus a' is zero. This is consistent with the result of the conversion equation above since the bit value a XORed with the bit value a is zero when a equals one. Thus, regardless of whether the bit value of a is zero or one, a' is always zero and terms and partial products having an a' bit value can be ignored. FIG. 4b illustrates partial products generated from a further optimized signed squaring operation on the four bit modified signed binary number a' b' c' d'.

Figure 4C:
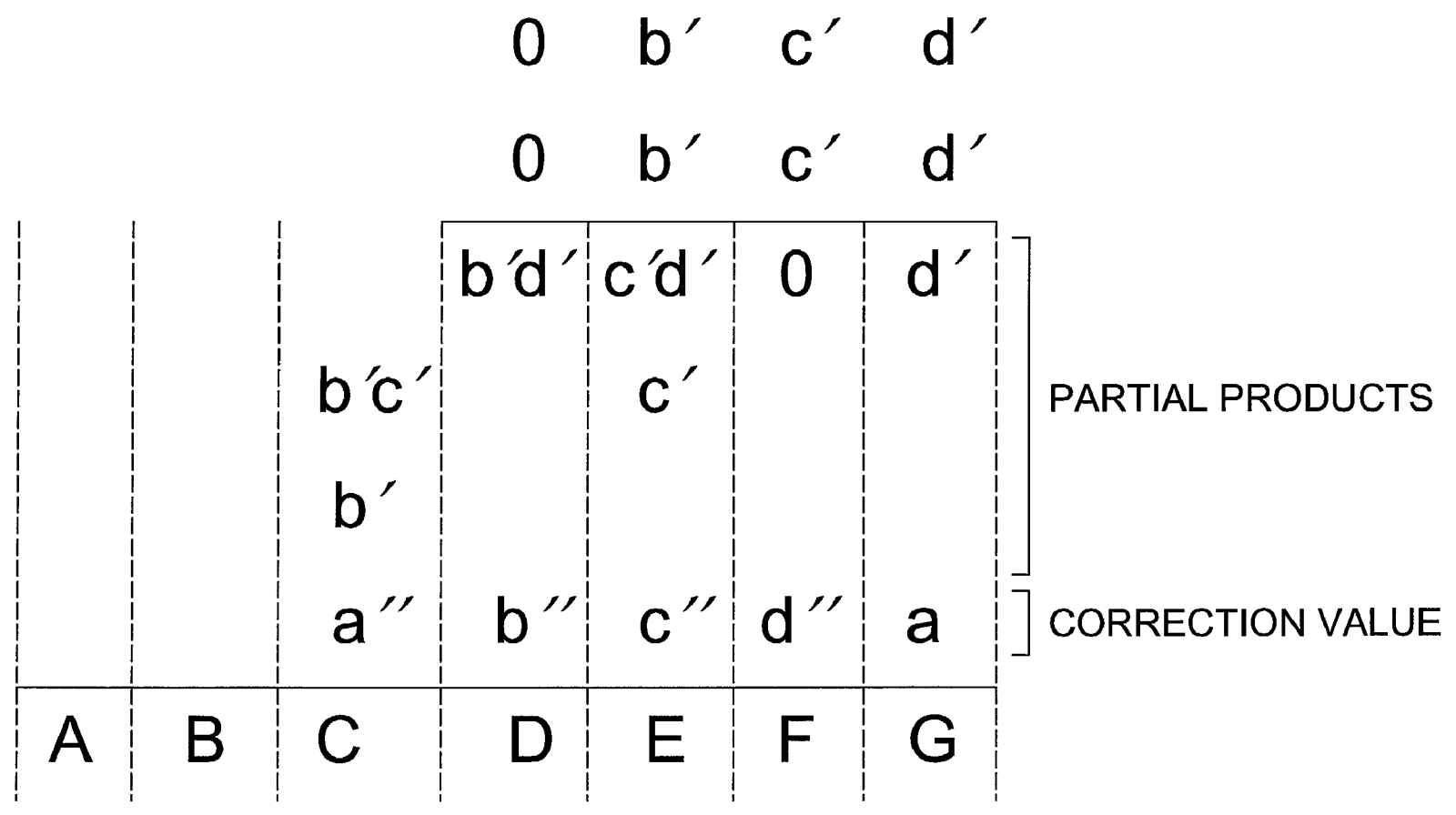

FIG. 4c illustrates the summing of the partial products generated using the further optimized signed squaring operation on the four bit modified signed binary number a' b' c' d' and correction values generated for signed binary number a b c d. According to an embodiment of the present invention, the correction value has the value of two times the inverse bit values of the signed binary number plus one (2!x+1). As shown in FIG. 4c, the correction value is represented with the binary number a'' b'' c'' d'' a, where a'', b'', c'', d'', and a are binary bit values from most significant bit to least. Terms marked with a double prime ('') are modified correction bits. According to an embodiment of the present invention, to generate a modified correction bit value from a regular bit value, the following equation may be applied.

Modified Correction Bit=Bit XOR Sign Bit AND Sign Bit.

The sum of the partial products with the correction value yields the squared value of the signed binary number a b c d, A B C D E F G.

Figure 5A:
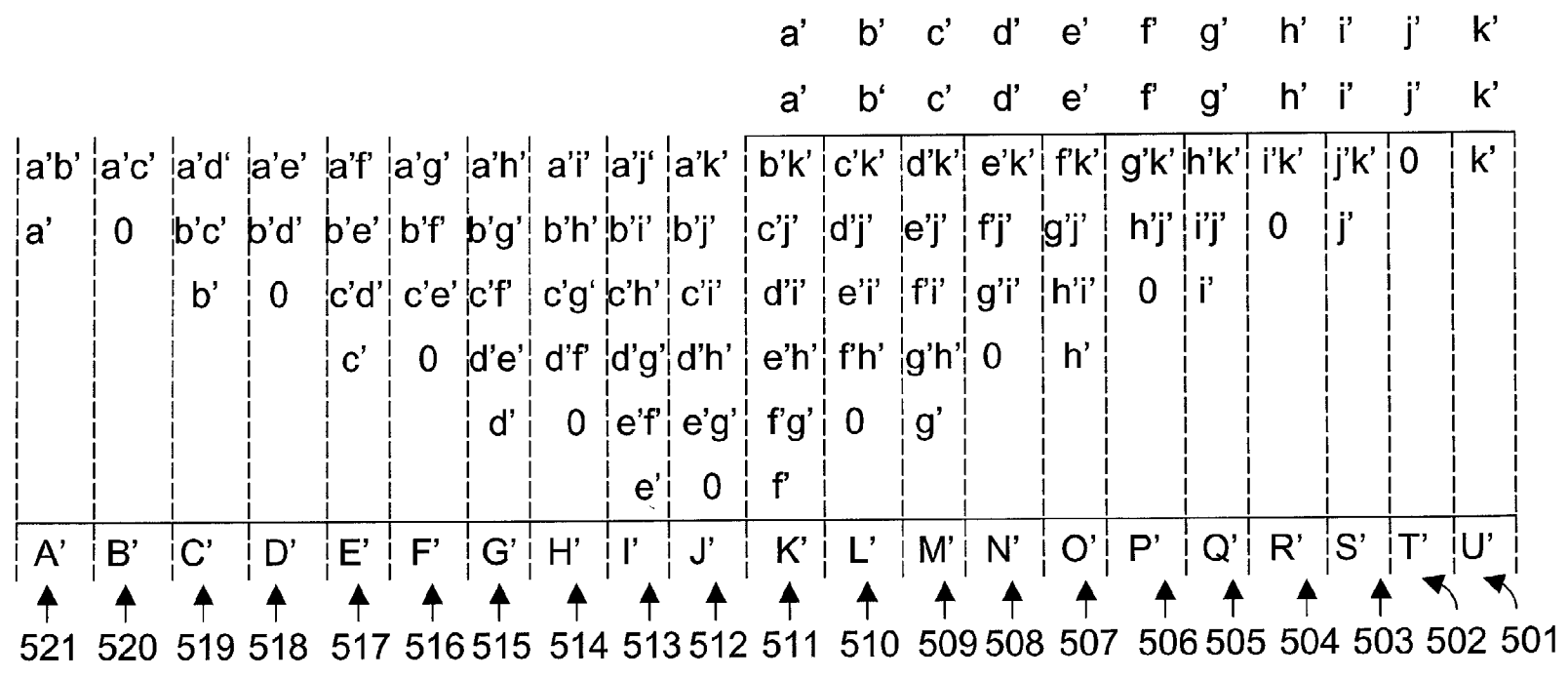
Figure 5B:
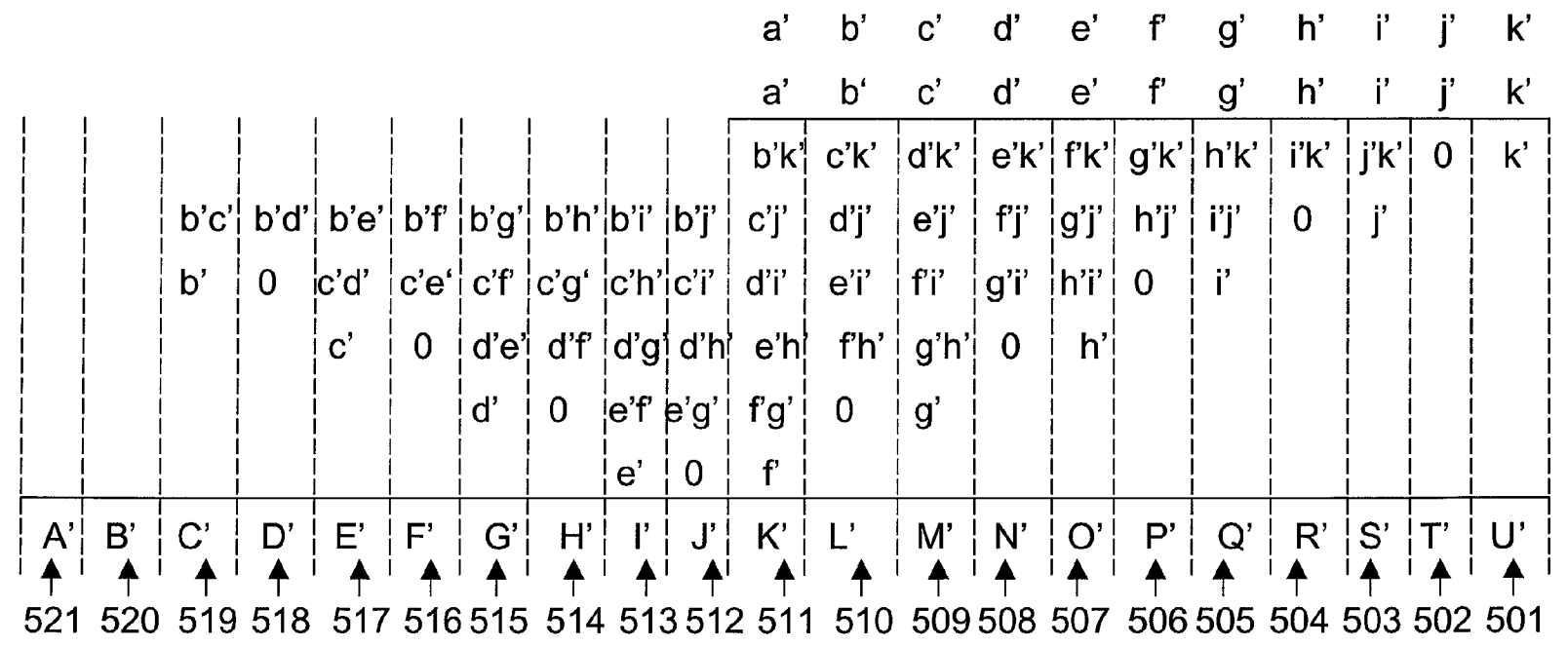

FIG. 5a illustrates partial products generated from an optimized signed squaring operation on an eleven bit unsigned binary number a' b' c' d' e' f' g' h' i' j' k', where a', b', c', d', e', f', g', h' i', j', and k' represent binary bit values from MSB to LSB. Binary number A' B' C' D' E' F' G' H' I' J' K' L' M' N' O' P' Q' R' S' T' U' represents the square value of the modified binary number a' b' c' d' e' f' g' h' i' j' k', where bits A', B', C', D', E', F', G', H', I', J', K', L', M', N', O', P', Q', R', S', T', and U' represent binary bit values in order from MSB to LSB. Columns 501–521 include partial products that are used to calculate the bit values of bits A', B', C', D', E', F', G', H', I', J', K', L', M', N', O', P', Q', R', S', T, and U' respectively. Utilizing the optimization techniques further disclosed, the number of partial products for the eleven bit modified signed binary number simplify as shown in FIG. 5b. FIG. 5b illustrates partial products generated from a further optimized signed squaring operation on the eleven bit modified signed binary number a' b' c' d' e' f' g' h' i' j' k'.

Figure 5C:
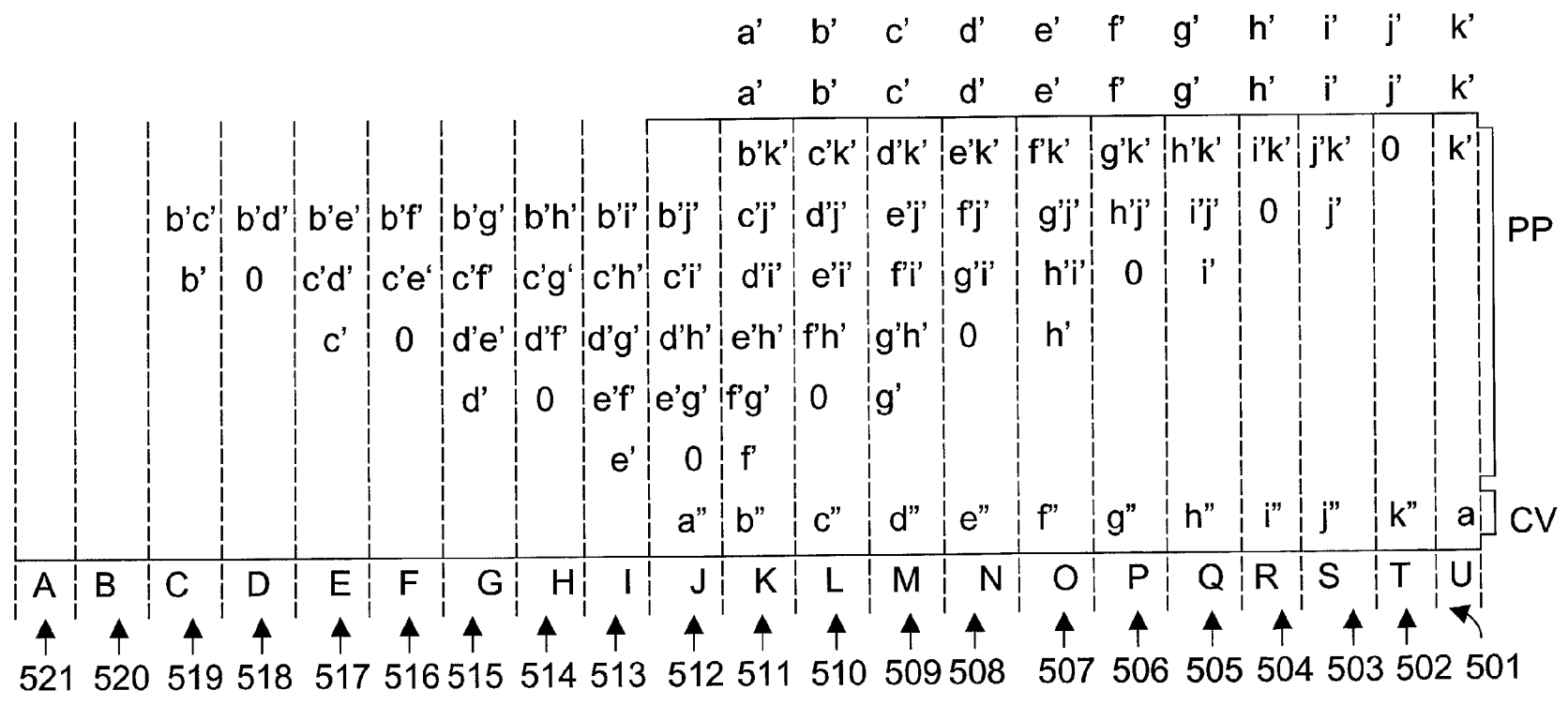

FIG. 5c illustrates the summing of the partial products generated using the further optimized signed squaring operation on the eleven bit modified signed binary number a' b' c' d' e' f' g' h' i' j' k' and correction values generated for signed binary number a b c d e f g h i j k. According to an embodiment of the present invention, the correction value has the value of two times the inverse bit values of the signed binary number plus one (2!x+1). As shown in FIG. 5c, the correction value is represented with the binary number a" b" c" d" e" f" g" h" I" j" k" a, where a", b", c", d", e", f", g", h", i", j", k" and a are binary bit values from most significant bit to least. Terms marked with a double prime (") are modified correction bits. According to an embodiment of the present invention, to generate a modified correction bit value from a regular bit value, the following equation may be applied.

Modified Correction Bit=Bit XOR Sign Bit AND Sign Bit.

The sum of the partial products with the correction value yields the square value of the signed binary number a b c d e f g h i j k, A B C D E F G H I J K L M N O P Q R S T U.

Several general characteristics about the relationship between the partial products and correction value and the squared value of a signed binary number exist as illustrated in FIGS. 4c and 5c. For example, the third MSB of the squared value of the signed binary number, C, has a value that includes the sum of a modified bit value of a second MSB of the signed binary number with a product of the modified bit value of the second MSB of the signed binary number with a modified bit value of a third MSB of the signed binary number. The fourth MSB of the squared value of the signed binary number, D, has a value that includes a product of the modified bit value of the second MSB of the signed binary number with a modified bit value of a fourth MSB of the signed binary number. The LSB of the square value of the signed binary number, G in the example shown in FIG. 4c and U in the example shown in FIG. 5c, includes a sum of a modified bit value of a LSB of the signed binary number and a bit value of the MSB of the signed binary number. The second LSB of the square value of the signed binary number, F in the example shown in FIG. 4c and T in the example shown in FIG. 5c, includes a modified correction bit value of the LSB of the signed binary number. It should be appreciated that when a value is said to "include" a sum of other values, the other values need not mutually exclude the inclusion of additional values. For example, the third MSB of the squared value of the signed binary number may have a value that also includes a carry over values from a previous column. It should also be appreciated that when a value is said to "include" a sum of other values, the value may be a representation of a non-carry over portion of the sum.

According to an embodiment of the squaring circuit 100 (shown in FIG. 1), the partial products generation unit 110 (shown in FIG. 1) utilizes the optimization techniques described with reference to FIGS. 4b and 5b. It should be appreciated that the partial products generation unit 110, summing unit 120, signed binary number modification unit 130, and correction value generation unit 140 (all shown in FIG. 1) may be implemented using any known circuitry or technique. According to an embodiment of the squaring circuit 100, the partial product generation unit 110, summing unit 120, signed binary number modification unit 130, and correction value generation unit 140 all reside on a single semiconductor substrate. The squaring circuit maybe implemented, for example, using programmable logic. By squaring a 1's complement representation of the signed binary number and adding correction values instead of squaring a 2's complement representation of the signed binary number, levels of logic elements on a programmable logic may be conserved.

According to an embodiment of the present invention, the squaring circuit 100 utilizes a 4-input look up table (LUT). The correction value (bit XOR sign bit AND sign bit) has three terms per bit, which fits into a single level of logic (or LUT). The partial products of the SBN (bit(multiplicand) XOR sign bit AND bit(multiplier)) also fit into a single LUT. In contrast, in twos complement implementation, there would be 3 levels of logic for the partial products generation. A first level for a bit XOR sign bit. A second level for an add 1 (this requires a ripple carry adder, which would incur an additional delay above the extra level of logic). A third level for a bit (multiplicand) AND bit (multiplier).

Figure 6:
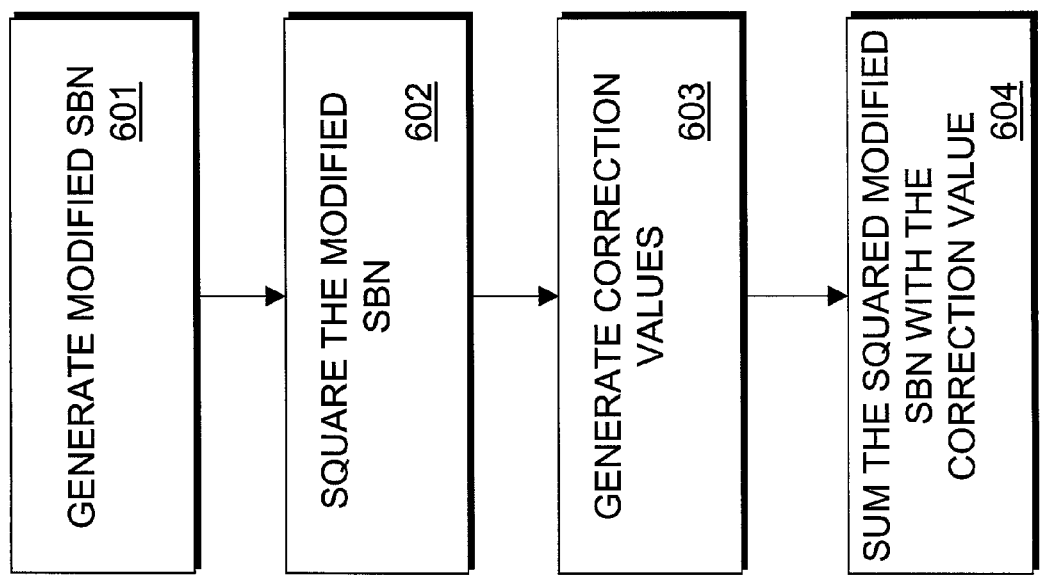
FIG. 6 is a flow chart illustrating a method for generating a squared value of a signed binary number according to an embodiment of the present invention.

FIG. 6 is a flow chart illustrating a method for generating a squared value of a signed binary number according to an embodiment of the present invention. At step 601, a modified signed binary number is generated from the signed binary number. When the signed binary number is negative, the bit values of the signed binary number are inverted to generate the modified signed binary number. This may be achieved, for example, by taking the 1's complement of the signed binary number. When the signed binary number is positive, the signed binary number is designated as the modified signed binary number. According to an embodiment of the present invention, the bit values of the signed binary number are XORed with the sign bit (the most significant bit) of the signed binary number.

At step 602, the modified signed binary number is squared. This may be achieved, for example, by using an unsigned squaring circuit. According to an embodiment of the present invention, partial products that may be used to calculate bit values of the squared modified signed binary number may be generated instead of the squared value of the modified signed binary number.

At step 603, a correction value is generated. When the signed binary number is negative and the modified signed binary number is a number other than the signed binary number, correction values operate to take into account that the number being squared is a 1's complement representation of the signed binary number as oppose to a 2's complement representation of the signed binary number. This value is two times the bit value of the inverse or 1's complement of the signed binary number plus one. When the signed binary number is positive, correction values are not required. Thus, the value of the correction value is zero.

At step 604, the squared modified signed binary number is summed with the correction value. The summed result is the squared value of the signed binary number. According to an embodiment of the present invention, the partial products that may be used to calculated bit values of the squared modified signed binary number are summed with the correction value.

Figure 7:
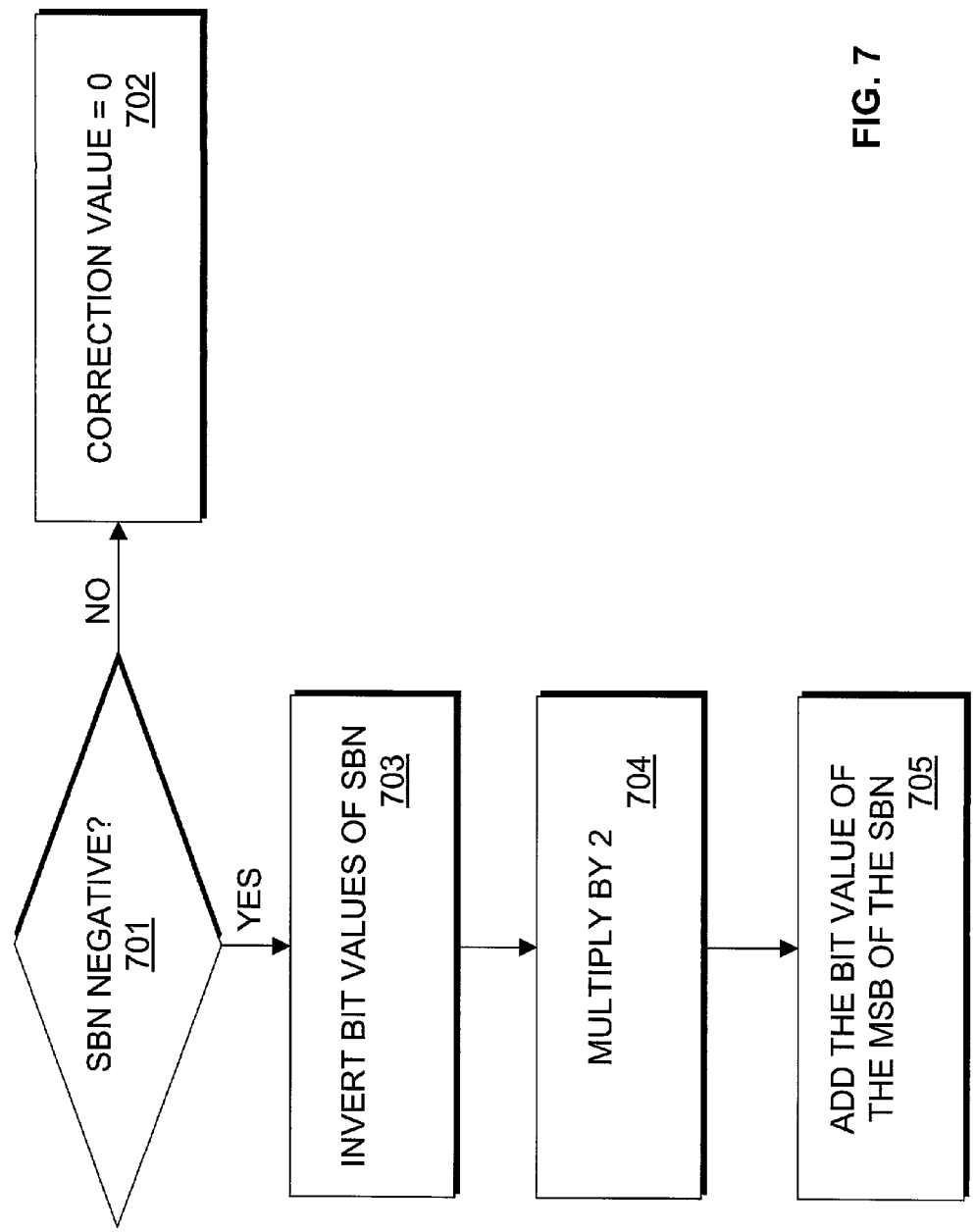
FIG. 7 is a flow chart illustrating a method for generating correction values according to an embodiment of the present invention.

FIG. 7 is a flow chart illustrating a method for generating correction values according to an embodiment of the present invention. At step 701, it is determined whether the signed binary number is negative. If the signed binary number is not negative, control proceeds to step 702. If the signed binary number is negative, control proceeds to step 703.

At step 702, zero is designated as the value of the correction value.

At step 703, the bit values of the signed binary number are inverted. The inverted number forms a first intermediate result. According to an embodiment of the present invention, the first intermediate result is generated by performing an XOR function on values of the signed binary number and the sign bit (the most significant bit of the signed binary number).

At step 704, the first intermediate result is multiplied by two to form a second intermediate result. The second intermediate number is unsigned.

At step 705, the bit value of the sign bit is added to the second intermediate result to form the correction value.

The methods described in FIGS. 6 and 7 may be used to generate a square value of a four bit signed binary number 1010 which equals −6 in base 10. Referring to step 601 in FIG. 6, a modified signed binary number is generated. Since the signed binary number is negative, the bit values are inverted to generate the signed binary number. This may also be achieved by performing an XOR function the bit values of the signed binary number with the sign bit (most significant bit). This yields the modified signed binary number 0101.

Figure 8A:
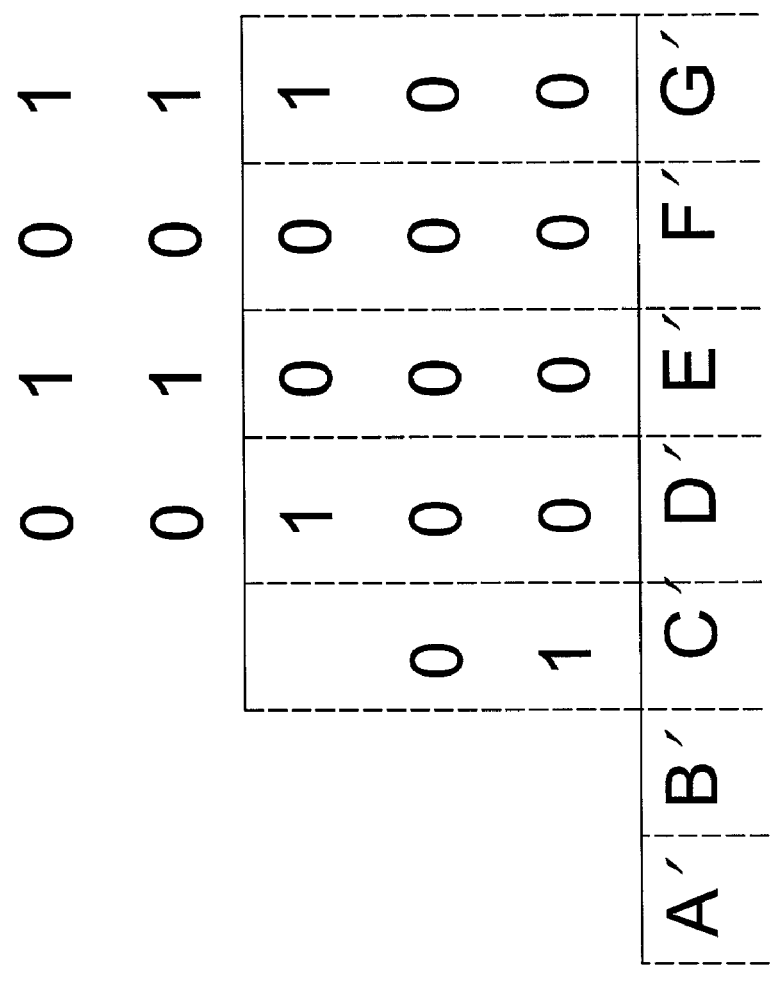

At step 602, partial products that are used to calculate bit values of a squared value of the modified sign bit 0101 are generated. Referring to FIG. 8a the partial products used to calculate bit values of a squared value of the modified sign bit 0101 are shown.

At step 603, correction values are generated. Referring to FIG. 7, at step 701 it is determined that the signed binary number 1010 is negative. Control proceeds to step 703.

At step 703, the bit values of the signed binary number 1010 are inverted to 0101 to form a first intermediate result.

At step 704, the first intermediate result 0101 are multiplied by two to form 1010, a second intermediate result.

At step 705, the bit value of the most significant bit of the signed binary number 1 is added to the second intermediate result 1010 to form correction value 1011.

Referring back to FIG. 6, at step 604, the partial products are summed with the intermediate results to form the square value of the signed binary number 0100100. FIG. 8b illustrates a summing of partial products and correction value for a four bit signed binary number.

FIGS. 6 and 7 illustrate flow charts describing a method for generating a square value of a signed binary number and a method for generating a correction value. Some of the steps illustrated in these figures may be performed sequentially, in parallel or in an order other than that which is described. It should be appreciated that not all of the steps described are required to be performed, that additional steps may be added, and that some of the illustrated steps may be substituted with other steps.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A squaring circuit for a signed binary number (SBN), comprising:
   means for generating a modified SBN by either inverting bits of the SBN if the SBN is negative or designating the SBN as the modified SBN if the SBN is positive;
   means for squaring the modified SBN to generate a squared modified SBN; and
   means for summing the squared modified SBN with a correction value.

2. The apparatus of claim 1, wherein inverting the bits of the SBN comprises taking a 1's complement of the SBN.

3. The apparatus of claim 1, wherein generating the modified SBN comprises performing an XOR function on the bit values of the SBN with a value of a most significant bit of the SBN.

4. The apparatus of claim 1, further comprising means for generating the correction value.

5. The apparatus of claim 4, wherein generating the correction value comprises either multiplying the modified SBN by two and adding a value of one if the SBN is negative or designating zero as the correction value if the SBN is positive.

6. The apparatus of claim 4, wherein generating the correction value comprises:
   performing an AND function on bit values of the modified SBN with the value of the most significant bit of the SBN to generate a first intermediate result;
   multiplying the first intermediate result by two to generate a second intermediate result; and
   adding the value of the most significant bit of the SBN to the second intermediate result.

7. The apparatus of claim 1, wherein squaring the modified SBN comprises using an unsigned squaring circuit.

8. A squaring circuit for a signed binary number (SBN), comprising:
   means for performing an XOR function on bit values of the SBN with a value of a most significant bit of the SBN to generate a modified SBN;
   means for squaring the modified SBN to generate a squared modified SBN; and
   means for summing the squared modified SBN with a correction value.

9. The apparatus of claim 8 further comprising means for generating the correction value.

10. The apparatus of claim 9, wherein generating the correction value comprises:
    performing an AND function on bit values of the modified SBN with the value of the most significant bit of the SBN to generate a first intermediate result;
    multiplying the first intermediate result by two to generate a second intermediate result; and
    adding the value of the most significant bit of the SBN to the second intermediate result.

11. A squaring circuit for a signed binary number (SBN), comprising:
    means for assigning to a third most significant bit (MSB) of the squared value a first bit value that includes a sum of a modified bit value of a second MSB of the SBN with a product of the modified bit value of the second MSB of the SBN with a modified bit value of a third MSB of the SBN;
    means for assigning to a fourth MSB of the squared value a second bit value that includes a product of the modified bit value of the second MSB of the SBN with a modified bit value of a fourth MSB of the SBN; and
    means for assigning to a least significant bit (LSB) of the squared value a third bit value that includes a sum of a modified bit value of a LSB of the SBN and a bit value of the MSB of the SBN.

12. The apparatus of claim 11, further comprising means for generating modified bit values of the SBN.

13. The apparatus of claim 12, wherein generating the modified bit values of the SBN comprises performing an XOR function on the bit values of the SBN with the MSB of the SBN.

14. The apparatus of claim 11, further comprising means for assigning to a fifth MSB of the squared value a fourth bit value that includes a sum of the modified bit value of the third MSB of the SBN with a product of the modified bit value of the third MSB of the SBN with a modified bit value of the fourth MSB.

15. The apparatus of claim 11, further comprising means for assigning to a second LSB of the squared value a fourth bit value that includes a modified correction bit value of a LSB of the SBN.

16. The apparatus of claim 15, further comprising means for assigning to a third LSB of the squared value a fifth bit value that includes a modified correction bit value of a second LSB of the SBN.

17. The apparatus of claim 16, further comprising means for assigning to a fourth LSB of the squared value a sixth bit value that includes a modified correction bit value of a third LSB of the SBN.

18. The apparatus of claim 17, further comprising means for assigning to a fifth LSB of the squared value an eighth bit value that includes a modified correction bit value of a fourth LSB of the SBN.

19. The apparatus of claim 15, further comprising means for generating modified correction bit values for the SBN.

20. The apparatus of claim 19, wherein generating the modified correction bit values for the SBN comprises:
performing an XOR function on the bit values of the SBN with the MSB of the SBN and performing to generate intermediate results; and
performing an ANDing function on the intermediate results.

21. A squaring circuit for signed binary numbers, comprising:
a signed binary number (SBN) modification unit that generates a modified SBN;
a partial product generation unit that generates partial products that make up a squared value of the modified SBN;
a correction value generation unit that generates a correction value for the SBN; and
a summing unit that sums the partial products with the correction value to generate a squared value for the SBN.

22. The apparatus of claim 21, wherein the SBN modification unit comprises a first circuit that performs an XOR function.

23. The apparatus of claim 21, wherein the correction value unit comprises a second circuit that performs XORing and ANDing functions.

24. The apparatus of claim 21, wherein the summing unit comprises an adder circuit.

25. The apparatus of claim 21, wherein the SBN modification unit inverts bits of the SBN if the SBN is negative and designates the SBN as the modified SBN if the SBN is positive.

26. The apparatus of claim 25, wherein inverting the bits of the SBN comprises taking a 1's complement of the SBN.

27. The apparatus of claim 21, wherein the SBN modification unit generates the modified SBN by performing an XOR function on the bit values of the SBN with a value of a most significant bit of the SBN.

28. The apparatus of claim 21, wherein the correction value generation unit multiplies the modified SBN by two and adds a value of one if the SBN is negative and designates zero as the correction value if the SBN is positive.

29. The apparatus of claim 21, wherein the correction value generation unit performs an AND function on bit values of the modified SBN with the value of the most significant bit of the SBN to generate a first intermediate result, multiplies the first intermediate result by two to generate a second intermediate result, and adds the value of the most significant bit of the SBN to the second intermediate result.

30. A squaring circuit for signed binary numbers, comprising:
means for generating a modified SBN;
means for generating partial results that make up a squared value of the modified SBN;
means for generating a correction value for the SBN; and
means for summing the partial results with the correction value to generate a squared value for the SBN.

* * * * *